(12) United States Patent
Halberstadt

(10) Patent No.: US 10,826,373 B2
(45) Date of Patent: Nov. 3, 2020

(54) CURRENT PULSE TRANSFORMER FOR ISOLATING ELECTRICAL SIGNALS

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/660,667

(22) Filed: Jul. 26, 2017

(65) Prior Publication Data

US 2019/0036439 A1    Jan. 31, 2019

(51) Int. Cl.
| | |
|---|---|
| *H02M 1/08* | (2006.01) |
| *H02M 5/293* | (2006.01) |
| *H01F 27/28* | (2006.01) |
| *H04B 3/00* | (2006.01) |
| *H02M 1/00* | (2006.01) |
| *H04B 1/58* | (2006.01) |

(52) U.S. Cl.
CPC .............. *H02M 1/08* (2013.01); *H01F 27/28* (2013.01); *H02M 5/293* (2013.01); *H04B 3/00* (2013.01); *H02M 2001/0009* (2013.01); *H02M 2001/0025* (2013.01); *H02M 2001/0048* (2013.01); *H04B 1/581* (2013.01)

(58) Field of Classification Search
CPC ................... H02M 1/08; H02M 5/293; H02M 2001/0009; H02M 2001/0025; H02M 2001/0048; H01F 27/28; H04B 1/581; H04B 1/58; H03K 17/12
See application file for complete search history.

(56) References Cited

U.S. PATENT DOCUMENTS

| | | | | |
|---|---|---|---|---|
| 4,342,976 | A | * 8/1982 | Ryser | .................. H01F 17/0006 336/200 |
| 4,677,536 | A | 6/1987 | Pepper | |
| 4,821,325 | A | * 4/1989 | Martin | .................... G10L 25/87 704/233 |
| 4,901,215 | A | 2/1990 | Martin-Lopez | |
| 5,036,450 | A | * 7/1991 | Kelleher, Jr. | ........... H02M 1/15 323/222 |
| 5,498,995 | A | * 3/1996 | Szepesi | ............. H02M 3/33507 327/538 |

(Continued)

FOREIGN PATENT DOCUMENTS

| | | | | |
|---|---|---|---|---|
| EP | | 0782266 A1 | * 7/1997 | ........... H03K 17/122 |
| WO | WO-2009/128025 A1 | | 10/2009 | |

OTHER PUBLICATIONS

English Translation of EP 0 782 266, Lauzenaz et al., Pulse Power Converter, Jul. 7, 1997, All Pages.*

*Primary Examiner* — Shawki S Ismail
*Assistant Examiner* — Demetries A Gibson

(57) ABSTRACT

A communication circuit for communication over a voltage isolation barrier, the communication circuit including a pulse driven transformer coupled to a current sensing input, wherein information is transferred in the current domain and wherein during the information transfer, the receiver input is made low ohmic, a current pulse transformer including a primary winding, a core, and a secondary winding, a resistor in parallel with the secondary winding, a current sensor having a low ohmic input to receive a pulse from the secondary winding, and a signal processing unit to extract information from the received pulse.

16 Claims, 10 Drawing Sheets

(56) References Cited

U.S. PATENT DOCUMENTS

| | | | |
|---|---|---|---|
| 5,499,176 A | 3/1996 | Erisman | |
| 5,753,888 A * | 5/1998 | Eldridge | B23K 9/0673 219/130.1 |
| 5,770,831 A * | 6/1998 | Kaneko | B23H 1/022 219/69.18 |
| 6,184,691 B1 * | 2/2001 | Prough | G01R 31/1263 324/515 |
| 6,355,992 B1 * | 3/2002 | Via | H01F 30/08 307/106 |
| 2002/0125942 A1 * | 9/2002 | Dunnebacke | H03K 3/02337 330/69 |
| 2009/0063064 A1 * | 3/2009 | Jackson | H02H 1/063 702/58 |
| 2009/0230776 A1 * | 9/2009 | Ochi | H01F 19/00 307/83 |
| 2010/0027298 A1 * | 2/2010 | Cohen | H02M 3/33592 363/21.14 |
| 2010/0103703 A1 * | 4/2010 | Nishiyama | H02M 3/3376 363/17 |
| 2011/0184675 A1 * | 7/2011 | White | G01R 15/146 702/61 |
| 2011/0299572 A1 * | 12/2011 | Monsen | H04B 7/18513 375/214 |
| 2012/0081202 A1 * | 4/2012 | Nanayakkara | H01F 19/04 336/200 |
| 2012/0083224 A1 * | 4/2012 | Visser | H04B 1/525 455/83 |
| 2013/0293139 A1 | 11/2013 | Sadwick et al. | |
| 2014/0028188 A1 * | 1/2014 | Matsumoto | H05B 41/18 315/77 |
| 2014/0340939 A1 * | 11/2014 | Daly | H02M 1/40 363/17 |
| 2014/0368167 A1 * | 12/2014 | Okura | H02J 5/005 320/109 |
| 2015/0244283 A1 * | 8/2015 | Lawson | H02J 3/32 363/84 |
| 2016/0003873 A1 * | 1/2016 | Boudreau, Jr. | G01R 15/18 324/127 |
| 2016/0299555 A1 * | 10/2016 | Rucker | H05B 33/0845 |
| 2016/0342182 A1 * | 11/2016 | Deboy | H02M 3/33507 |
| 2019/0280599 A1 * | 9/2019 | Moffat | H02M 3/3376 |

\* cited by examiner

CURRENT PULSE TRANSFORMER FOR ISOLATING ELECTRICAL SIGNALS

TECHNICAL FIELD

The invention relates generally to circuits for isolating various electrical signals, and more particularly to an improved isolation circuit having a current pulse transformer.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Embodiments described herein include a communication circuit for communication over a voltage isolation barrier, the communication circuit including a current pulse transformer including a primary winding, a core, and a secondary winding, wherein information is transmitted in the current domain, the current pulse transformer being coupled to a current sensing input, a current sensor having a low ohmic input to receive a current pulse from the secondary winding, and a signal processing unit to extract information from the received current pulse.

The core may include a ringcore or aircore.

The current pulse transformer may include a single turn primary winding.

The current pulse transformer may include a single turn secondary winding.

A mains isolation may be provided by a isolation of the windings. The isolation may be provided by a triple isolated wire.

The current pulse transformer may be part of a two-way communication channel. A sender channel of a receiving part may be inactivated during the sending sequence in order to prevent shorting the sender current.

The timing of the pulses may include the information to be transferred. The timing is one chosen from duration and distance between pulses.

Information may be transferred on an upward slope and downward slope of the current pulse.

An amplitude of communicated pulses may include the information to be transferred.

The communication circuit may be part of a switched mode power supply (SMPS).

Various embodiments also include a communication transformer, including a current source configured to provide a plurality of current pulses, a current pulse transformer including a core, a single input winding wrapped around a first section of the core, and a single output winding wrapped around a second section of the core, wherein the output side of the current pulse transformer is a low ohmic node.

The low ohmic node may be the emitter of a bipolar transistor.

A high current input may be transformed into a low current output.

Digital pulses may be communicated across the current pulse transformer.

The communication circuit may include an amplifier at the low ohmic node to decrease the resistance of the low ohmic node.

Embodiments may also include a circuit configured to sense current in a receive side of a transformer, where the sensed current is compared with a reference current and wherein a difference between the sensed current and the reference current is used to set an offset voltage at an input node of the receive side.

The circuit may include an amplifier and feedback loop between the receive side of the transformer and an output node.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
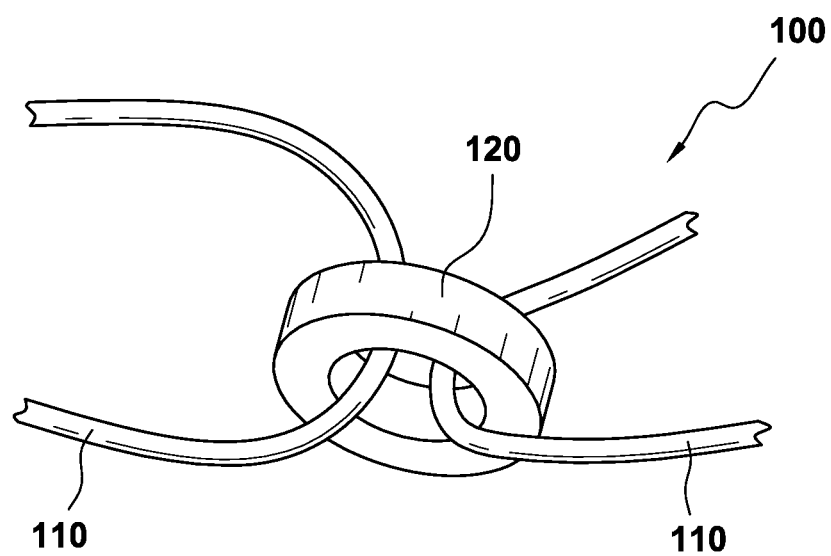
FIG. 1 illustrates a current pulse transformer in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application. When steps of manufacture, process of using, or other method steps are described or claimed, the order of steps given is not constrained by the order presented, and may vary.

Various applications in the electronics industry use isolation of electrical signals. Switch mode power supplies (SMPS) often include mains isolation in order to generate an isolated output. Uses of isolated SMPS include adapters for laptops, power supplies for desktop PCs, battery chargers for mobile communication, etc.

In such applications, often a regulated output voltage or current is available (secondary, isolated side), while control of the output is implemented at the primary (mains connected) side. One way to apply output control is by using an opto coupler configured to transfer an error signal from a secondary side to a primary side of a current pulse transformer. This error signal represents a difference between an actual value of the output and desired value of the output.

There may be reasons to deviate from the use of an opto coupler. For example an increased desire for energy saving and therefore desired reduction of power consumption. Further considerations are requirements at low load (250 mW output power) and no load that ask for a reduction of currents in dissipative elements, such as opto couplers. Consumer applications are typically very cost driven. Inexpensive opto couplers may draw a minimum current level of several milliamps in order to function properly.

Previous pulse transformer based communication circuitry has disadvantages such that a voltage across a pulse transformer builds up magnetizing current in the transformer. Due to magnetisation of the core, core losses occur that can be represented by a relatively small resistor in parallel with the transformer. When driving the transformer with a voltage, both the magnetizing inductance and resistance are in parallel with the driving voltage and may be assumed to be undesired parasitics because most of the signal is lost as it is shorted by the parasitics. In a voltage domain, transformers of small size have a disadvantage of a low value of the magnetizing inductance. This may indicate that a relatively small volt-second product is necessary to drive the transformer when driving it with a voltage pulse. In practice, even when very short pulses are used (100 ns) to drive the transformer, not the smallest core can be used and also a minimum number of approximately 5 turns is necessary. A current level during the driving pulse may have an amplitude on the order of 10 mA to prevent magnetizing current from disturbing proper operation.

In cost driven applications, a pulse transformer should be as inexpensive as possible. This means that the smallest core is desired while the number of turns may be one at both sides to simplify manufacturing and reduce cost.

Using low power, embodiments described herein use a current pulse transformer to communicate data accurately. A current pulse transformer uses the current domain to transfer information. Current pulse transformers as described herein may be applied in systems where high currents may be sensed with low losses, for example in e-metering, motor control applications, etc.

As described herein, the current to be sensed flows through a single wire. The input winding of the current pulse transformer may be not more than one turn of the wire. This wire may be positioned as a single winding of a current pulse transformer core as part of a current probe. At a receive side another single turn is present and configured to reduce the current level to a value that can be sensed by signal processing circuitry. A receive winding of the current pulse transformer may also be not more than one turn of the wire. Current pulse transformers use the current domain to convert a high current to a low current that can be sensed.

Embodiments described herein include a communication circuit having a current pulse transformer, drivers, and receivers that can communicate over a mains isolation barrier of a SMPS converter where the current pulse transformer is driven in the current domain using a low ohmic sensing input for sensing the signal. This low ohmic sensing provides various characteristics. By driving a current pulse transformer in the current domain, a smaller structure is possible. Using low ohmic sensing, a current pulse transformer may be shorted and therefore a magnetizing inductance and a loss resistance is shorted, preventing or at least limiting the current to flow in these parasitics.

Due to the shorted current pulse transformer, no (or at least a very small) magnetization of the core occurs. Because loss resistance represents mainly magnetizing losses, the shorted current pulse transformer further increases the loss resistance. Because a low voltage occurs across the loss resistance, the loss resistance itself is larger. This is because of the nonlinear behavior of this loss mechanism, which makes operation in the current domain more effective. Thus the receive side may receive a signal in the ground node, and the current is further processed. In a reverse transmission, an output is essentially a current pulse. According to embodiments described herein, a current may be sent across a current pulse transformer without having much voltage in the transformer.

Circumstances described herein allow an ability to use a relatively low current to drive the current pulse transformer, as all current will remain available for the sensing input. Due to a shorted current pulse transformer, relatively long ON time is permitted for driving pulses, making both driving and detecting circuitry simpler. Embodiments described herein discuss how to make the receiver. One-way and two-way communication is discussed, such that communication may be sent from the primary winding to the secondary winding, and from the secondary winding to the primary winding.

FIG. 1 illustrates a communication current pulse transformer 100 in accordance with embodiments described herein. Embodiments allow a reduction in the number of turns to one (1) wire 110 for transmit and receive at the smallest ringcore size available, while 10 mA current or smaller current levels can be used for pulse transmission. These changes bring a breakthrough in cost and make it easier to fulfill the requirement of extremely low input power at no load. A single ringcore 120 may be a ring such as ferrite or an air core formed with only one wire turn at each side.

Figure 2:
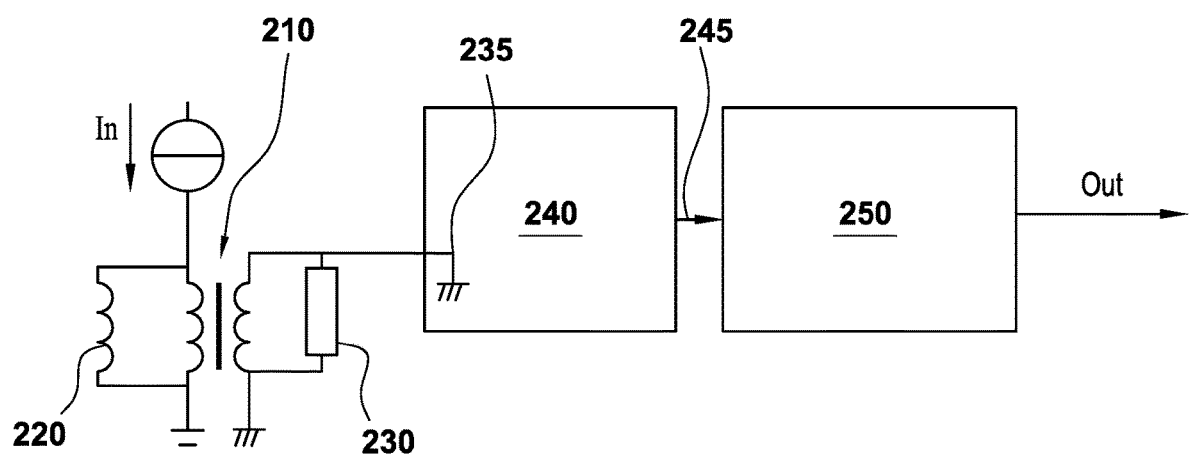
FIG. 2 illustrates a current pulse transformer circuit in accordance with embodiments described herein.

FIG. 2 illustrates a current pulse transformer circuit in accordance with embodiments described herein. As illustrated in FIG. 2, a current In is input into a current pulse transformer 210. The current pulse transformer 210 may be represented by an ideal transformer including a parasitic magnetizing inductance 220 and loss resistance 230, the loss resistance 230 representing the losses in the current pulse transformer due mainly to mainly magnetization and winding resistance.

The signal In includes the information to be transferred as current driven into the current pulse transformer 210. This information can be represented by the timing of the signal In. For example In may be a pulse sequence in which the width of the pulses or the distance between pulses or a combination thereof represents the information to be transferred. Instead of the timing to control information, the amplitude or sign of the signal In may include information.

In both cases, current is picked up at the second side of the current pulse transformer 210 by a current sensor 240, having a low ohmic input 235. This low ohmic input 235 prevents part of the current to flow into parasitics of the current pulse transformer. Parasitics such as magnetizing inductance from inductor 220 and loss from resistance 230.

The second side of the current pulse transformer 210 has a parallel impedance including the loss resistance 230 and the current sensor 240. As the second side low ohmic input 235 is not actually ground, the current is divided by the parallel impedance including the input impedance of the current sensor 240 and the loss resistance 230 in the current pulse transformer. The lower the impedance of the input of the current sensor 240, the more current goes to the current sensor 240, not to the loss resistance 230.

The current sensor 240 has an output signal 245 that is further processed by a signal processing unit 250 where information is extracted from the signal. Using integrated circuit technology, several options are possible to realize a low ohmic input current sensor 240.

Figure 3:
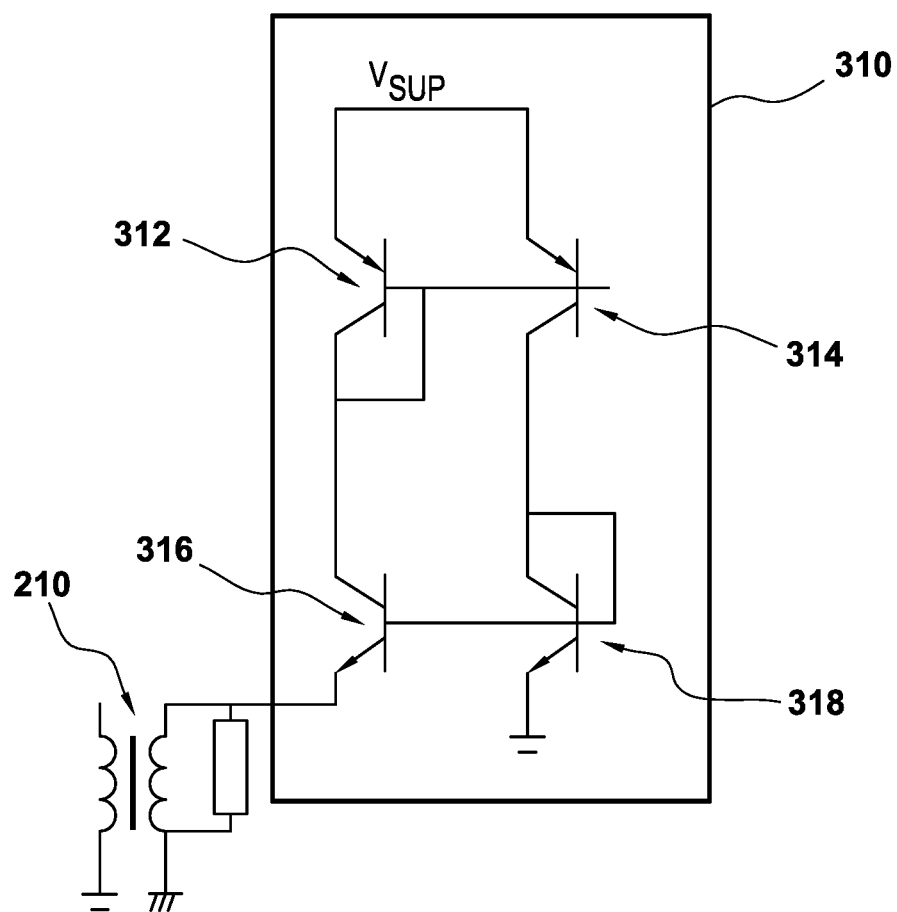
FIG. 3 illustrates a double current mirror construction including a separate loop of the bias current in accordance embodiments described herein.

FIG. 3 illustrates a double current mirror circuit 310 including a separate loop of the bias current in accordance with embodiments described herein. The current mirror 310 may use four transistors 312, 314, 316, and 318. Transistors 312 and 314 may be PNP bipolar transistors, and transistors 316 and 318 may be NPN. The right side of this current mirror 310 has two transistors 314 and 318. NPN transistor 318 may have a certain bias voltage. NPN transistor 316 connected thereto may have the same bias voltage. Transistor 318 may receive a current which is a copy of the input current into transistor 316, meaning that the base-emitter voltage ($V_{BE}$) of both NPN transistors 316 and 318 is equal. When the emitter of NPN 318 is ground, then the emitter of NPN 316 is also at ground potential. When this occurs, this means that the voltage across the current pulse transformer 210 is also ground, which establishes a low input node at the emitter of the NPN transistor 316. The current mirror 300 thus mirrors current and the voltage across transistors 312 and 316 to be respectively the same as transistors 314 and 318. This circuit is used in combination with embodiments described herein.

Figure 4:
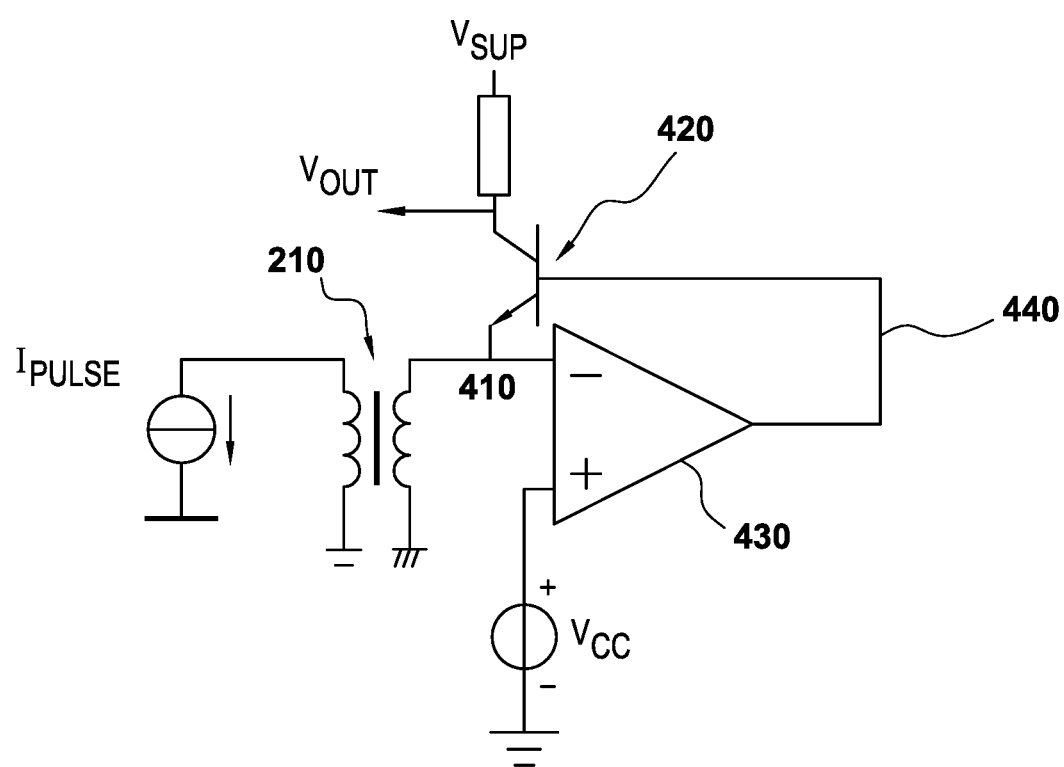
FIG. 4 illustrates a current pulse transformer and receiver circuit in accordance with embodiments described herein.

FIG. 4 illustrates a current pulse transformer 210 and receiver circuit in accordance with embodiments described herein. As illustrated in FIG. 4, an output signal $V_{OUT}$ of the current pulse transformer 210 is connected to PNP transistor 420 that has a low ohmic node 410 at an emitter of thereof. The receiver circuit includes the emitter of the NPN transistor 420, which is low ohmic. To make this receiver circuit even more low ohmic, an amplifier 430 may be used. A positive input of the amplifier 430 may be a voltage potential $V_{CC}$, and the negative input may be a voltage level derived from the output current in the secondary side of the communication current pulse transformer 210. By use of the amplifier 430 which may have a feedback loop 440, the impedance of the transistor 420 may be further reduced with the loop gain. For example, at about 1 mA, the bias current of the NPN transitory 420 may have an output impedance of approximately 26 ohms. If the voltage at the minus input of the amplifier is amplified by a factor of 100, the output impedance can be reduced by a factor of 100, establishing the output node 410 as a virtual ground node.

Embodiments described herein keep the resistance of node 410 as close as possible to zero. When current is injected into the primary side of the current pulse transformer 210, the current is transformed to the secondary side and it is injected into this virtual ground at node 410, which may keep the voltage in the current pulse transformer as close as possible to zero.

Using the current pulse transformer 210, a current pulse is sent across the mains isolation, but because the current pulse transformer 210 also has a magnetizing inductance in parallel with the receiver that causes a parallel impedance, part of the signal maybe lost. Thus the voltage across this parallel path is kept small. With a low voltage, there can also be little current flowing in this parallel path. To achieve this, embodiments described herein make this impedance as low as possible so that there is little to no current flowing in such a parallel path.

Figure 5:
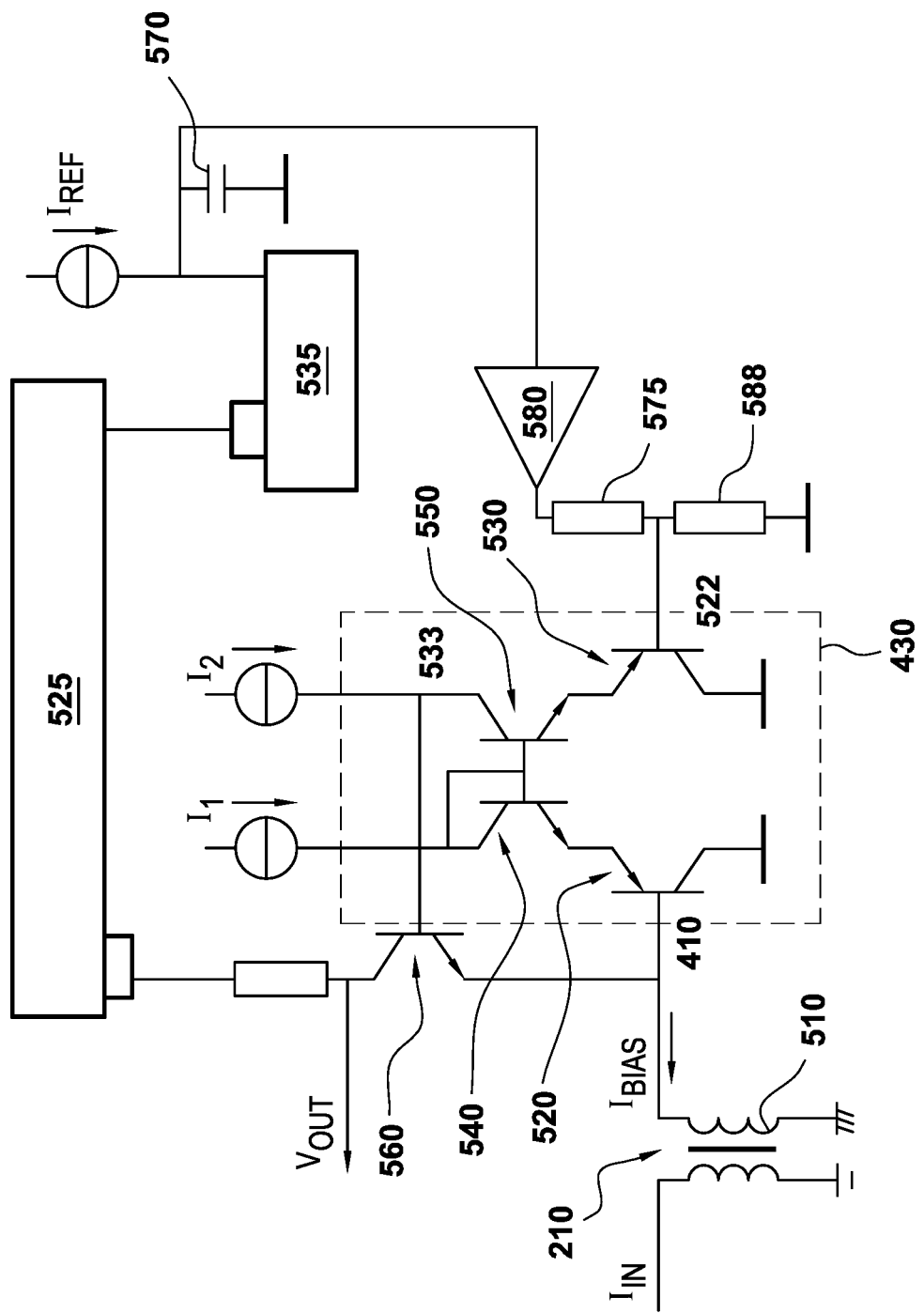
FIG. 5 illustrates a receiver side including an amplifier configuration in accordance with FIG. 4.

FIG. 5 illustrates a receiver side including an amplifier configuration 430 in accordance with FIG. 4. As illustrated in FIG. 5, the output signal of the current pulse transformer 210 is connected to the low ohmic point 410 which is an emitter of an NPN transistor 560 and the base of a PNP transistor 520.

As illustrated in FIG. 5, without feedback, the input impedance at an emitter of an NPN 560 equals Vt/Ic, where Vt is the thermal voltage (26 mV at room temperature) and Ic is the bias current in transistor 560. At Ic=100 uA, for example, the impedance is 260 ohm. One goal may be to reduce the input impedance of the current pulse transformer 210 to a level below the impedance of the magnetizing inductance of transistor 560 (approx. 10 ohm at 5 MHz). This magnetizing inductance may be used to get most of the injected current at the primary side of the current pulse transformer 210 into the emitter of transistor 560.

A feedback loop may be based on a voltage amplifier 430 in FIG. 4 which is represented by transistors 520, 530, 540, and 550 in FIG. 5. Node 410 of FIG. 5 represents the negative input of the amplifier 430. Node 522 of FIG. 5 represents the positive input the amplifier 430. Current sources I1 and I2 may be applied to the amplifier 430 to compare voltage at node 410 and reference voltage at node 522 and adapt the base voltage of transistor 560 in order to keep both voltages equal. The amplifier circuit may effectively reduce the input impedance at node 410 by a factor Gm×Z1, where Gm is the transconductance of the amplifier (520, 530, 540, and 550) stage and Z1 is the impedance at node 533. Node 533, the collector of transistor 550 may represent the output impedance of transistor 550 and the current source I2 in parallel with the input impedance of transistor 560 at its base.

This input impedance factor may be in general a few hundred. For example, Gm may have the equation Gm=Ic/Vt. At node 533 an impedance is Z1=Va/Ic, where Va is the early voltage of transistor 550 in parallel with I2. Va depends on the transistor construction and is in general around 10-100 Volts. Thus Gm×Z1 is then Va/Vt so approximately the range becomes 10/26 mV=380 to 100/26 mV=3800. This feedback may enhance the current domain operation of current pulse transformer 210.

An autozero loop including current mirror 525, current mirror 535, reference current Iref, capacitor 570, buffer amplifier 580, resistor 575, and resistor 585 is used to regulate the voltage across a current pulse transformer receiver winding 510 to such a value that a well defined DC bias current can flow in the NPN 560 at the input as determined by Iref. The difference between current mirror 535 output (being related to the bias current Ibias in the current pulse transformer 210) and reference current Iref is then integrated by the capacitor 570, buffered by the amplifier 580, and divided by resistors 575 and 585 to create a bias voltage at node 522 at the other side of the input stage such that the proper DC bias current occurs. The capacitor 570 denotes a pole such that the time constant of the auto zero loop is much larger than the pulse width of the signals from the current pulse transformer 210 such that the bias loop maintains its average value.

Additions to the circuit of FIG. 5 may include a diode in series with the transistor 560 emitter to keep the transistor 550 out of saturation. There are a number of ways to get similar functionality, for example reversing the polarity of NPN and PNP transistors respectively or replacing capacitor 570 by an analog to digital converter input, implementing the autozero loop in the digital domain, and providing the signal for node 522 via a digital to analog converter.

As noted above, the amplifier 430 may be used to make the receive side more low ohmic to prevent part of the received current pulse to flow into parasitics of the current pulse transformer 210. As illustrated in FIG. 5, the amplifier includes two PNP transistors 520 and 530 and two NPN transistors 540 and 550 with respective current sources I1 and I2. Output from NPN transistor 550 is used to control the base of the transistor 560.

The amplifier illustrated in FIG. 5 has a bias loop, which may cause the input voltage of the amplifier to be zero. The current in the input voltage is sensed, which is mirrored through current mirrors 525 and 535 having predetermined ratios, and then the sensed current is compared with a reference current Iref. The difference between Iref and an actual current is integrated with the capacitor 570, to create a regulation loop. Thus error signals and the difference between the desired value and the reference value are integrated. This integrated value can change for voltage. In equilibrium the circuit will regulate to a voltage at an input node having a zero value. If the sensed current is constant, the low ohmic node 410 will have almost zero impedance, and also zero voltage.

Figure 6:
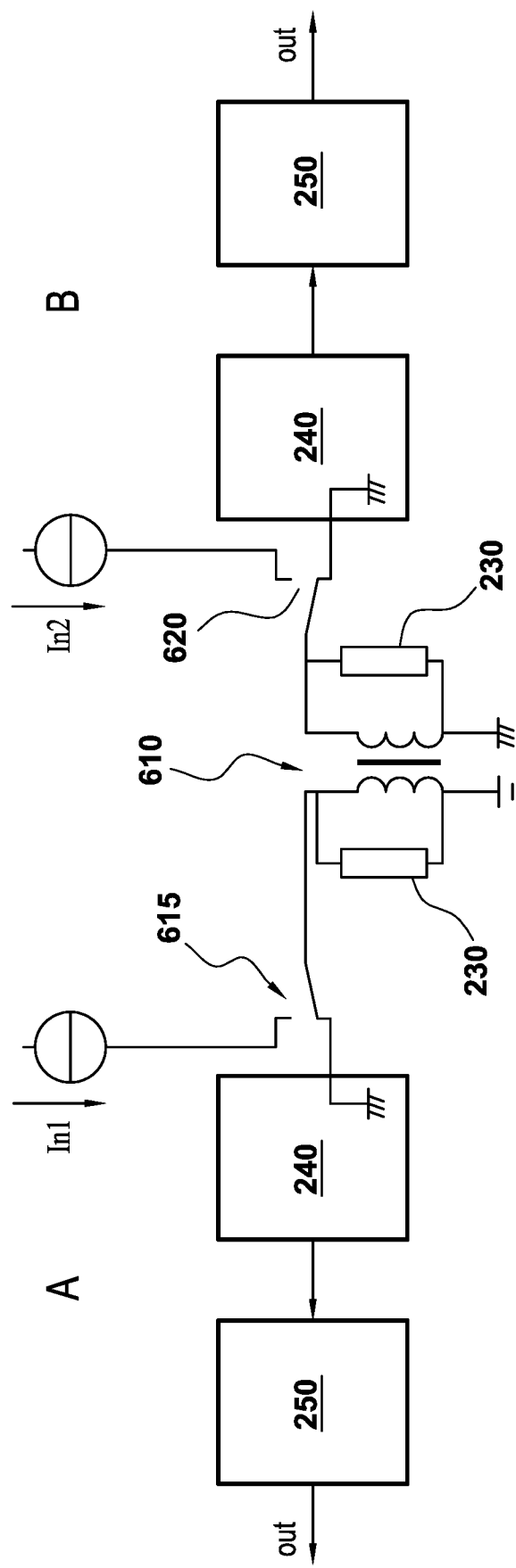
FIG. 6 illustrates a bi-directional communications current pulse transformer in accordance with embodiments described herein.

In order to allow for bidirectional communication, embodiments described herein include ways to change between the driving current source or low ohmic input to be effectively connected to the current pulse transformer winding, as illustrated in FIG. 6.

FIG. 6 illustrates a bi-directional communications current pulse transformer 610 in accordance with embodiments described herein. FIG. 6 illustrates a circuit diagram to change between a driving current source or low ohmic input to be effectively connected to the current pulse transformer winding.

In FIG. 6 a selection to change communication direction is performed by switches 615 and 620, but other possibilities are also used such as changing the bias conditions of the current sensor in order to make a high ohmic node. Embodiments described herein allow the circuit of FIG. 5 to be used both as a transmit and receive circuit in the configuration of FIG. 6. For the circuit illustrated in FIG. 5 changing a bias condition may be performed by grounding node 533 when a transmission occurs. The driving current source may be turned off if the corresponding side of the current pulse transformer is in the receiving mode.

As illustrated in FIG. 6, communications may span from the left side A or the right side B, with either side being the sender or receiver. Send or receive operations may be controlled by switches 615 and 620. When in a receive mode, either side receives current in the current sensor 240 at a virtual ground level. When in a send mode, a side A or side B may be connected to a current source. Current pulses may then be sent in either direction.

Figure 7:
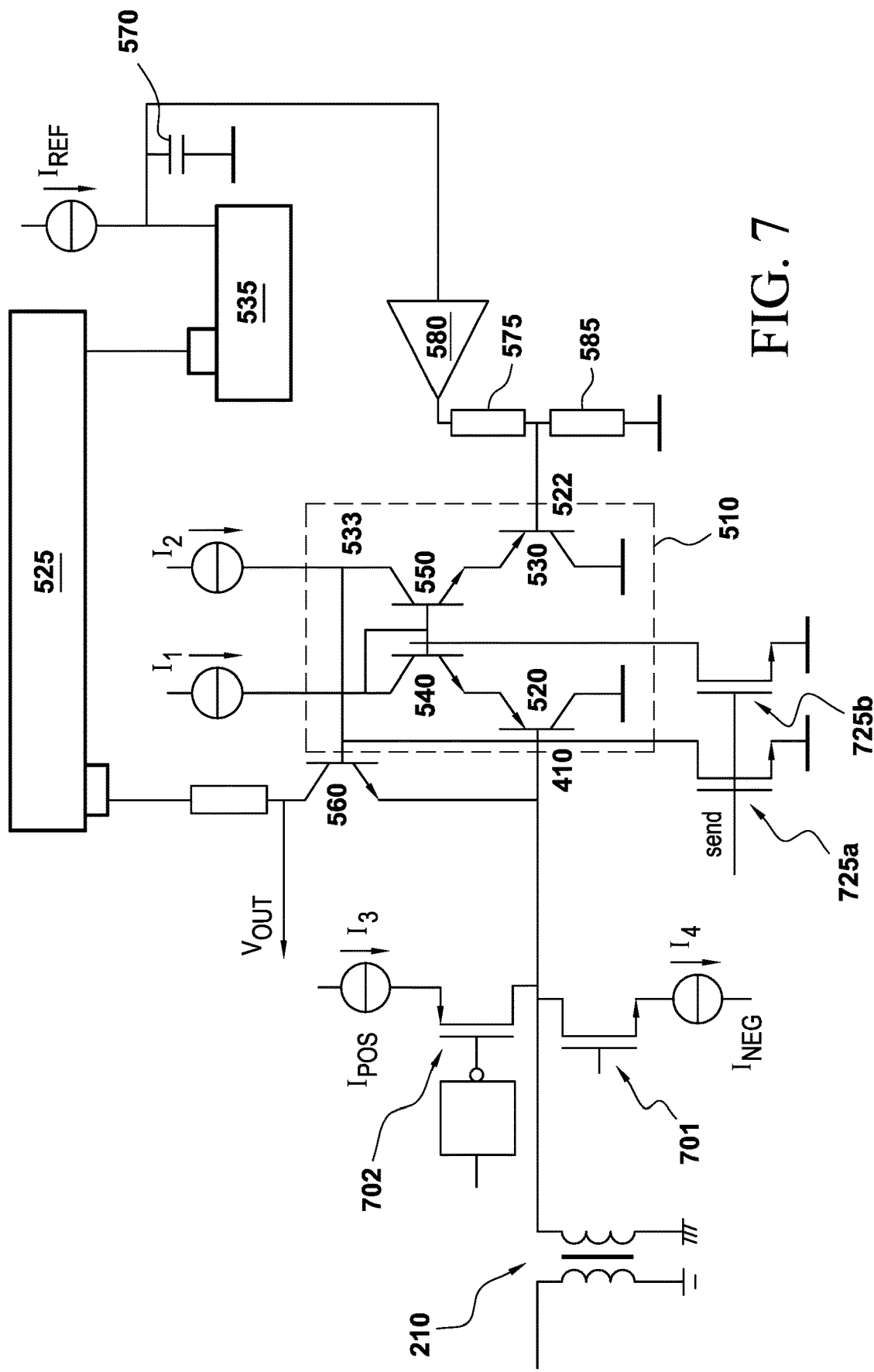
FIG. 7 illustrates a circuit diagram including positive and negative current pulse transmission in accordance with embodiments described herein.

FIG. 7 illustrates a circuit diagram 700 including positive and negative current pulse transmission in accordance with embodiments described herein. Reference numerals from previous figures are carried over to represent similar circuit elements. As illustrated in FIG. 7, output from amplifier 430, the collector of transistor 550, drives the base of transistor 560 to make the amplifier loop. Bias currents I1 and I2, and transistors 520-550, make up the amplifier 430 which amplifies the voltage difference between the emitter of transistor 540 and the emitter of transistor 550. Using the two transistor pairs, the input at the emitter of transistor 560 becomes more low ohmic. The input to transistor 560 is the emitter entered at the base of transistor 520. The same holds for transistors 530 and 550. The voltage difference between the base of transistor 520 and the base of transistor 530 is converted into current with the collector of transistor 550, and this current is subtracted from I2, and the difference drives 520. When the circuit settles, then there is more current flowing in the base of transistor 560. The currents are approximately the same in transistor 540 and transistor 550.

The output signal of the amplifier 430 is input to the collector of transistor 550. The output current from the collector of the transistor 550 is multiplied by a resistor in the collector to produce the signal out ($V_{OUT}$).

The circuit 700 illustrated in FIG. 7 may represent one side sender A or receiver B of a bi-directional communication device. Communication from one direction to another may include a positive pulse 810 (illustrated in FIG. 8) that enables I3 by a pmos switch 702 and an inverter 705 when 'pos pulse' 810 is high. In the same way a negative pulse 820 (illustrated in FIG. 8) that enables I4 by an nmos switch 701 when 'neg pulse' 820 is high. The current I3 or I4 is then sent into the transformer 210 to the other side of the communication channel and received by the receiver at the other side (side A, side B include the same circuitry). Supposing that side A illustrated in FIG. 7 acts as a sender, then NMOS transistors 725a and 725b at side A are switched on. Both switches connect to bases of transistor 560 and 540 to ground to disable the receiver part of the circuit 700 at the sender side.

The feedback described in relation to FIG. 5 may enhance the current domain operation of current pulse transformer 210 illustrated in FIG. 7 as well.

Regarding the transistor 430 illustrated in FIG. 7, the base of transistor 520 is the minus input. The base of transistor 530 is the plus input. The amplifier cell is transistors 540 and 550, and current sources I1 and I2. Transistor 540 is biased by current source I1. Because the bases of transistors 540 and 550 are connected, both transistors are matched, meaning that collector current in transistor 550 will equal I1 when both the emitter voltages of transistors 540 and 550 are equal.

In such a case also current in transistors 520 and 530 will equal I1. Then also the base voltage in transistors 520 and 530 will be equal. When I2=I1, current in the base of transistor 560 will equal I2 minus the collector current in transistor 550, which is I2 minus I1, resulting in zero. This is an equilibrium state where the base voltages of transistors 520 and 530 are equal.

When the base voltage of transistor 560 drops, the collector current in transistor 550 reduces and therefore a current flows into the base of transistor 560, being amplified with the current gain of transistor 560. This effectively gives the low output impedance at emitter of transistor 560 and following the voltage at node 522.

The current Iref may be input to current mirror 535. When the collector current in transistor 560 T1 equals Iref, (assuming mirror factor of 525, 535=1), the output current of current mirror 535=Iref, giving zero current to charge capacitor 570. The voltage at capacitor 570 may be buffered at the amplifier 580 and divided by ratio R2/(R1+R2) to define the reference voltage at node 522. When the voltage at node 410 is lower than at node 522, current in transistor 560 is higher than Iref. This means that capacitor 570 is discharged with the collector current Iref minus the collector current of transistor 560, thereby reducing the voltage at node 522. In the equilibrium, current in collector of transistor 560 equals Iref. Because node 410 is connected to the transformer secondary winding with one side grounded, while the average voltage across a transformer winding must be zero, this may mean that node 410 settles at a voltage 0V. The capacitor 570 provides a dominant pole (time constant) in the bias loop making it stable.

Referring back to FIGS. 4 and 5, in operation the negative input of the amplifier 430 is the base input to transistor 530. The positive input of the amplifier 430 is the base of transistor 520. The voltage at the base of transistor 520 and transistor 530 is copied to the emitter of transistor 520 and transistor 530. These values are level shifted, but at the same time they are made more low ohmic because they are transferred to the emitter of those transistors. The value on the emitters then becomes input for transistors 540 and 550. Transistors 540 and 550 are an amplifier shell. A difference between the voltage at the emitter of transistor 540, and a voltage at the emitter of transistor 550 is converted into a current. There is a difference in current at the collector of transistor 540 and transistor 550 because transistor 540 and transistor 550 are biased with different current sources I1 and I2. In the equilibrium situation this means that when a voltage at the base of transistor 520 is zero, then a voltage at the base of transistor 530 is slightly positive. This is because of different currents I1 and I2 flowing into transistor 530, so that transistor 530 can work at an operating point of its output being slightly positive, because in practical circuitry no negative supply is available. If the voltage at the emitter of transistor 540 and transistor 550 are according to the operating point where I1 and I2 flow in the collectors , then the output current of transistor 560 can be regulated to a value ref, meaning there is a very small current flowing into the base of transistor 560. When a slightly different voltage is applied at the emitters of transistor 540 and transistor 550, this is directly converted in a quite large current for the input of transistor 560.

As illustrated, the circuit may copy the voltage of node 522 to be the voltage of node 410, optionally including a fixed offset as defined by the ratio I1/I2. In other words, a circuit topology in accordance with embodiments described herein may be configured to sense current in the receive side of a transformer 210, where the sensed current is compared with a reference current and where a difference between both currents sets an offset voltage at the input node 410 of the receive side. The 430 and feedback loop 440 are disposed between the receive side of the transformer and an output node.

When the voltage at node 522 is set to ground plus a small offset, the voltage at node 410 is also set to ground. In the transistor 540, the base and collector are connected together to drive the transistor 560 with current in the base, so there is current output at transistor 560. The collector current of transistor 550 drives transistor 560. The current I2 is DC current. The collector current of transistor 550 is subtracted from the current I2, and that current drives transistor 560.

When the circuit is settled, the current in transistor 550 is almost equal to the current I2, in that the emitter voltage of transistor 540 may be equal to the emitter voltage of transistor 550, such that the voltage at node 410 and node 522 are also equal. As soon as there is a slight difference between those two voltages, there is a change in current in the collector of transistor 550, and that change in current directly drives transistor 560. This compensates the difference at node 410.

A bias loop including current mirror 525, current mirror 535, transistor 560, and a buffer 580 with resistors 575 and 585 senses the current in transistor 560. The bias loop regulates a current level that is defined by Iref. Supposing the current mirrors 525 and 535 have a current mirror factor of 1, then the current in transistor 560 will be regulated to the level Iref such that the output current of current mirror M2 equals Iref causing the voltage at capacitor 570 to remain constant. Any current in capacitor 570 would cause a voltage change at the input of amplifier 580 and a voltage change at node 522 that results in a current change at the collector of transistor 560. Capacitor 570 may be a low frequency filter configured to adapt for low frequencies, in which high frequencies cannot pass. This results in a high frequency pulse at node $V_{OUT}$ as a result of a current pulse in current pulse transformer 210, that will not influence the bias loop, so this bias loop with capacitor 570 is only very slowly adapting the bias current in transistor 520. This provides a kind of a bias level.

The signal at the output ($V_{OUT}$) is an intermediate signal that can be further processed by pulse shaping circuitry, depending on the requirements to convert it into digital level signals. Node $V_{OUT}$ is compatible with both one side polarity pulses or dual polarity pulses. For use with dual polarity pulses, the bias voltage at node $V_{OUT}$ can be chosen as a value near the middle of the supply voltage to allow it to swing to both positive or negative side with respect to the bias voltage.

According to embodiments described herein, current pulses are input, and then the pulses are added to this bias level. The mirror structure and the capacitor buffer slowly adapt the voltage at node 522 to keep the voltage at node 410 at ground level and define the reference current in transistor 560.

The capacitor 570 is a high ohmic point because it is the difference between two currents integrated by the capacitor 570. A voltage buffer is then used to make node 522 a low ohmic node. A division is made by resistors 575 and 585. Because the voltage at node 522 becomes small, there may only be a change of only a few mV. A larger signal may be desired across the capacitor 570 to use the voltage of the capacitor 570. If a division factor is sufficient between resistors 575 and 585, a sufficiently high signal may be obtained at 570. Thus a smaller capacitor 570 may be used. The division factor of resistors 575 and 585 enables capacitor 570 to be small as well as the current biasing to be as small as possible.

Figure 8:
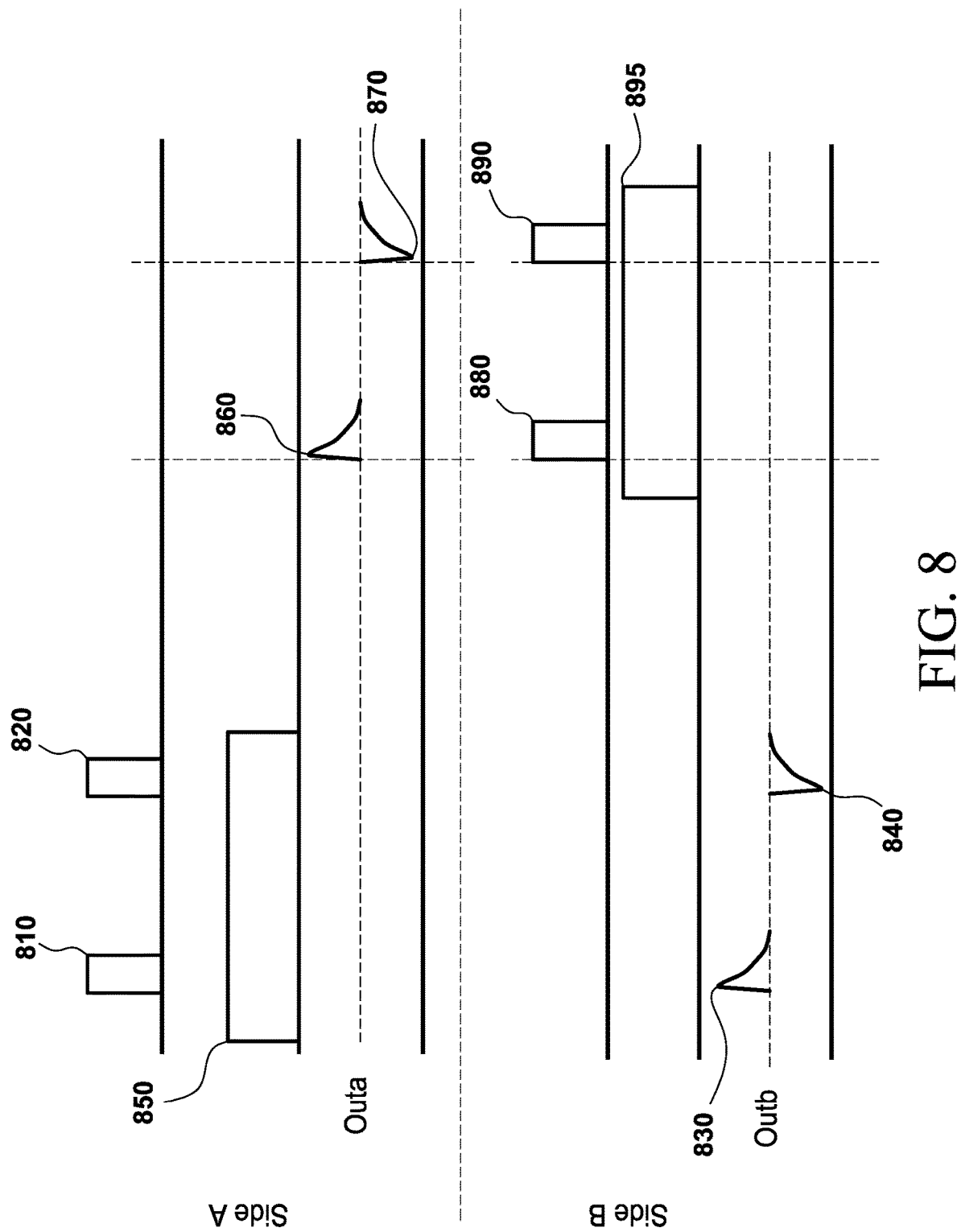
FIG. 8 illustrates timing diagrams for positive and negative pulses in accordance with FIGS. 7.

FIG. 8 illustrates timing diagrams for positive and negative pulses in accordance with FIG. 7. FIG. 8 illustrates a side A and a side B of a communication channel using a bi-directional current pulse transformer in accordance with FIG. 6. Side A is the sender and side B is the receiver. FIG. 8 illustrates that at a first moment in time, side A is the sender and side B may receive a positive current pulse 830 or negative current pulse 840 depending on the signal sent from side A when a send signal 850 is high at NMOS FETs 725a and 725b of FIG. 7. Conversely when transmission is from side b to side A, Outa shows signal pulses 860 and 870 received at side A when side B sends a positive pulse 880 or a negative pulse 890 when a send signal 895 is high from the B side.

Embodiments described herein include different ways of sending a pulse through the current pulse transformer 110. Embodiments allow a choice to be made regarding a direction of the pulse. Embodiments allow the transmission of a positive pulse or a negative pulse.

Figure 9:
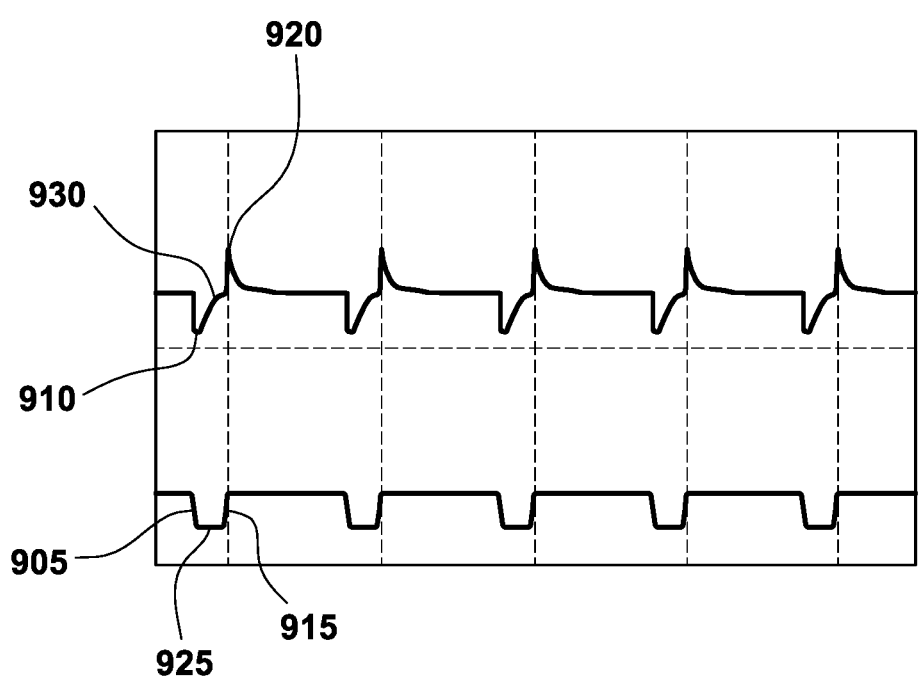
FIGS. 9 and 10 illustrate waveforms in which the positive or negative slope of a pulse holds the information to be transferred.
Figure 10:
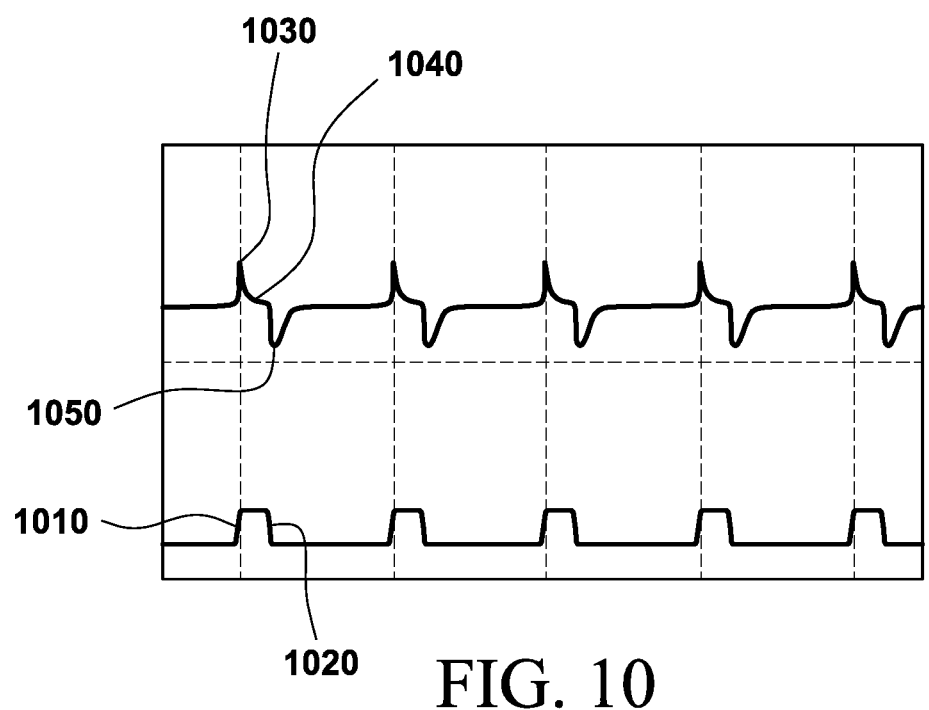

FIGS. 9 and 10 illustrate waveforms in which the positive or negative slope of a pulse holds the information to be transferred. Beside short pulses, also longer pulses can be used to define a dual polarity communication system.

As illustrated in FIG. 9, there are different ways to send information. Referring back to FIG. 8, information may be sent when a pulse spikes high or low. Alternatively, as illustrated in FIG. 9, a rising or falling slope of a pulse may be used to convey information. In FIG. 9, a bottom pulse is the sent pulse being the current in the primary winding of the current pulse transformer, the upper pulse is the received pulse. At 905, the negative pulse slopes downward. This downward slope entering the primary winding of the current pulse transformer 210 is registered as a pulse 910 in the second side of the current pulse transformer 210. During a recover interval 925 in the send pulse, the receive pulse likewise recovers at 930. When the send pulse returns to zero and the pulse slopes upward at 915, a positive current spike is received at the secondary winding, illustrated as 920 in FIG. 9. FIG. 10 illustrates an alternative to FIG. 9, in which an initial slope may be positive, followed by a recovery period, and the wave transitioning to a downward slope. The information is thus transferred on the slope of the pulse. Regarding the pulse trains illustrated in FIGS. 9 and 10, a time difference between the positive slope and the negative slope can be determined, and the time difference can be used as another way of coding information. In addition to the description of the current pulse transformer 210, the current pulse transformer 210 may also include different ways to send information. FIG. 10 illustrates similar principles to FIG. 9 using a positive sloped waveform 1010 followed by a negative slope 1020 as the send pulse. At a receive side as illustrated by the upper pulse, first a current spike 1030 represents the received positive pulse. Then the system will settle at 1040. When receiving the negative transmitted pulse 1020, the receive side will spike downwards at 1050, before resetting.

Embodiments described herein may be applied to systems where isolation is used and where communication across the isolation is needed, while power consumption is an issue, such as high efficiency SMPSs.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

The invention claimed is:

1. A communication circuit for bi-directional communication over a voltage isolation barrier, the communication circuit comprising:
    a shorted current pulse transformer including a first wire positioned as a single turn primary winding, a single ringcore, and a second wire positioned as a single turn secondary winding, wherein the single turn primary winding and the single turn secondary winding are disposed on opposite sides of the single ringcore and do not overlap, information is transmitted in a current domain, and the shorted current pulse transformer is configured to be coupled to a current sensing input;
    a pair of current sensors, each current sensor having a low ohmic input and configured to receive a current pulse, respectively, from the single turn primary winding and from the single turn secondary winding; and
    a signal processing unit to extract information from the received current pulse.

2. The communication circuit of claim 1, where a mains isolation is provided by an isolation of the windings.

3. The communication circuit of claim 1, wherein a mains isolation is provided by a triple isolated wire.

4. The communication circuit of claim 1, wherein a sender channel of a receiving part is inactivated during a sending sequence in order to prevent shorting the sender current.

5. The communication circuit of claim 4, wherein a timing is one chosen from duration and distance between pulses.

6. The communication circuit of claim 1, wherein a timing of the pulses includes the information to be transferred.

7. The communication circuit of claim 1, wherein information is transferred on an upward slope and downward slope of the received current pulse.

8. The communication circuit of claim 1, wherein an amplitude of the received current pulse includes the information to be transferred.

9. The communication circuit of claim 1, wherein the communication circuit is part of a switched mode power supply (SMPS).

10. The communication circuit of claim 9, wherein the low ohmic node is the emitter of a bipolar transistor.

11. The communication transformer of claim 9, wherein a high current input is transformed into a low current output.

12. The communication circuit of claim 9, wherein digital pulses are communicated across the shorted current pulse transformer.

13. The communication circuit of claim 9, comprising an amplifier at the low ohmic node to decrease the resistance of the low ohmic node.

14. A bi-directional communication transformer circuit, comprising:
    a current source configured to provide a plurality of current pulses;
    a shorted current pulse transformer configured to receive the plurality of current pulses, the shorted current pulse transformer including a single ringcore, a first wire positioned as a single turn input winding wrapped around a first section of the single ringcore, and a second wire positioned as a single turn output winding wrapped around a second section of the single ringcore, wherein the first section and the second section are disposed on opposite sides of the single ringcore, the single turn input winding and the single turn output winding do not overlap, and the output side of the shorted current pulse transformer is a low ohmic node;
    a pair of current sensors, each current sensor configured respectively to receive current from the single turn input winding and the single turn output winding and output a respective signal; and
    a signal processing unit configured to receive the respective signal and extract information therefrom.

15. A bi-directional circuit configured to sense current on either side of a shorted current pulse transformer having a single turn secondary winding, where the sensed current is compared with a reference current, wherein a first wire positioned as a single turn primary winding and a second wire positioned as the single turn secondary winding are disposed on opposite sides of a single ringcore and do not overlap and a difference between the sensed current and the reference current is used to set an offset voltage at an input node of a side selected as the receive side, and a pair of current sensors, each current sensor configured respectively to receive current from the single turn primary winding and the single secondary output winding and output a respective signal.

16. The circuit of claim 15, further comprising:
an amplifier and feedback loop between the receive side of the transformer and an output node.

* * * * *